(12) United States Patent
Williams (10) Patent No.: US 12,305,768 B2
(45) Date of Patent: May 20, 2025

(54) TWO-WAY VALVE

(71) Applicant: Shiloh Williams, Upalco, UT (US)

(72) Inventor: Shiloh Williams, Upalco, UT (US)

( * ) Notice: Subject to any disclaimer, the term of this patent is extended or adjusted under 35 U.S.C. 154(b) by 0 days.

(21) Appl. No.: 18/773,541

(22) Filed: Jul. 15, 2024

(65) Prior Publication Data

US 2025/0020227 A1    Jan. 16, 2025

Related U.S. Application Data (60) Provisional application No. 63/513,458, filed on Jul. 13, 2023.

(51) Int. Cl.
*F16K 15/02*    (2006.01)

(52) U.S. Cl.
CPC ...... *F16K 15/028* (2013.01); *F16K 2200/304* (2021.08)

(58) Field of Classification Search
CPC ............................... F16K 15/028; F16K 17/26
See application file for complete search history.

(56) References Cited

U.S. PATENT DOCUMENTS

| | | | |
|---|---|---|---|
| 3,171,423 A * | 3/1965 | Dillon | F16K 15/026 |
| | | | 137/218 |
| 5,072,752 A | 12/1991 | Kolchinsky | |
| 5,112,301 A | 5/1992 | Fenton, Jr. et al. | |
| 5,290,263 A | 3/1994 | Wigness et al. | |
| 7,296,545 B2 | 11/2007 | Ellingsen, Jr. | |
| 9,416,886 B2 | 8/2016 | Smith, III | |
| 2005/0028869 A1 * | 2/2005 | Roth | F16K 17/196 |
| | | | 137/493.4 |
| 2008/0047613 A1 | 2/2008 | Huang | |
| 2010/0269935 A1 | 10/2010 | Breunig et al. | |
| 2014/0090733 A1 | 4/2014 | Sauerbrey | |
| 2016/0069471 A1 | 3/2016 | Ewers et al. | |
| 2016/0230900 A1 | 8/2016 | Schulz et al. | |

FOREIGN PATENT DOCUMENTS

| | | |
|---|---|---|
| CA | 2480140 | 5/2011 |
| CN | 102734500 | 4/2017 |
| EP | 0609145 | 1/1994 |

OTHER PUBLICATIONS

PCT Application No. PCT/US24/38112 International Search Report, Oct. 4, 2024.

* cited by examiner

*Primary Examiner* — P. Macade Nichols
(74) *Attorney, Agent, or Firm* — Kunzler Bean & Adamson (57) ABSTRACT

Various embodiments are disclosed for a two-way valve. A two-way valve includes a valve body and a valve assembly couplable to the valve body. The valve assembly includes a first valve component and a second valve component. The first valve component is actionable to allow or prevent a first fluid flow through the apparatus in a first direction and the second valve component is actionable to allow or prevent a second fluid flow through the apparatus in a second direction opposite the first direction.

17 Claims, 13 Drawing Sheets

TWO-WAY VALVE

CROSS-REFERENCE TO RELATED APPLICATIONS

This application claims the benefit of U.S. Provisional Patent Application No. 63/513,458 entitled "TWO-WAY VALVE" and filed on Jul. 13, 2023, for Shiloh Williams, which is incorporated herein by reference

FIELD

This invention relates to valves and more particularly relates to a two-way valve.

BACKGROUND

A valve is a device or natural object that regulates, directs or controls the flow of a fluid (e.g., gases, liquids, fluidized solids, or slurries) by opening, closing, or partially obstructing various passageways.

BRIEF SUMMARY

Various embodiments are disclosed for a two-way valve. In one embodiment, a two-way valve includes a valve body and a valve assembly couplable to the valve body. In one embodiment, the valve assembly includes a first valve component and a second valve component. In one embodiment, the first valve component is actionable to allow or prevent a first fluid flow through the apparatus in a first direction and the second valve component is actionable to allow or prevent a second fluid flow through the apparatus in a second direction opposite the first direction.

In one embodiment, the first valve component is configured as a plug for an opening in the second valve component. In one embodiment, the first valve component is forced away from the second valve component in response to a pressure of the first fluid flow acting against the first valve component to allow the first fluid flow through the opening in the second valve component.

In one embodiment, the first valve component is coupled to a resistance member that is configured to pull the first valve component towards the second valve component to plug the opening in the second valve component until the first fluid flow provides sufficient pressure to overcome the resistance member and force the first valve component away from the second valve component.

In one embodiment, the resistance member comprises a spring. In one embodiment, the apparatus includes an adjustment mechanism that is actuable to adjust a resistance of the resistance member.

In one embodiment, the second valve component is coupled to a resistance member that is configured to push the second valve component is a direction opposite the second fluid flow. In one embodiment, the resistance member comprises a spring.

In one embodiment, the valve body comprises a retaining member that is configured act against the second valve component and set a tension of the resistance member. In one embodiment, the valve assembly is screwed into the valve body and the tension of the resistance member is set based on how far the valve assembly is screwed into the valve body.

In one embodiment, the retaining member includes at least one opening for allowing fluid flow through the valve body. In one embodiment, the first valve component and the second valve component are forced away from the retaining member in response to a pressure of the second fluid flow acting against the first valve component and the second valve component to allow the second fluid flow to flow around the second valve component.

In one embodiment, the second valve component has a smaller diameter than an inner diameter of the valve body. In one embodiment, a position of the retaining member within the valve body is adjustable to adjust a resistance of the resistance member coupled to the second valve component.

In one embodiment, a two-way valve includes a valve body comprising a retaining member within the valve body and a valve assembly couplable to the valve body. In one embodiment, the valve assembly includes a first valve component coupled to a first resistance member. The first resistance member is configured to pull the first valve component in a first direction. In one embodiment, the valve assembly includes a second valve component coupled to a second resistance member. The second resistance member is configured to push the second valve component in a second direction opposite the first direction. In one embodiment, the first valve component is actionable to allow or prevent a first fluid flow through the two-way valve towards the second direction. In one embodiment, the second valve component is actionable to allow or prevent a second fluid flow through the two-way valve in the first direction.

In one embodiment, a method includes providing a valve body, providing a valve assembly, and coupling the valve assembly to the valve body. In one embodiment, the valve assembly includes a first valve component and a second valve component. In one embodiment, the first valve component is actionable to allow or prevent a first fluid flow in a first direction. In one embodiment, the second valve component is actionable to allow or prevent a second fluid flow in a second direction opposite the first direction.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

In general, the subject matter herein describes a two-way or dual valve that allows and prevents fluid flow in two opposite directions through the valve. Conventional valves are only configured to allow or prevent fluid flow in one direction. For apparatuses, machines, tools, and/or other devices where fluid flows in both direction (e.g., into and out of a tank), different valves may need to be changed out depending on the direction of the fluid flow, which can be time consuming, frustrating, and error prone. The subject matter herein describes a two-way or dual valve that allows and prevents fluid to flow in two directions without requiring changing valves.

Figure 1:
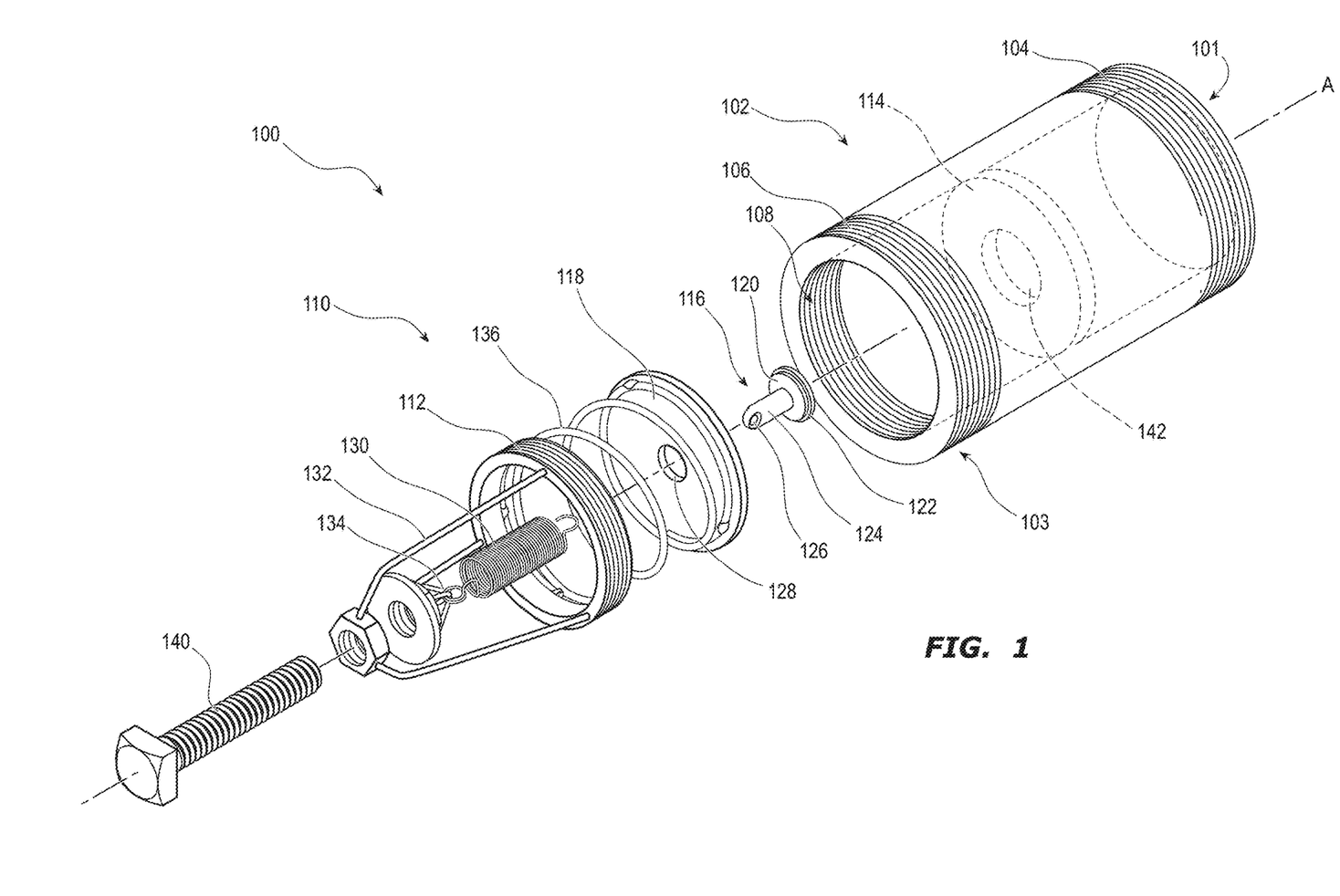
FIG. 1 is an exploded perspective view illustrating one embodiment of a two-way valve in accordance with the subject matter described herein.

FIG. 1 is an exploded perspective view illustrating one embodiment of a two-way valve 100 in accordance with the subject matter described herein. In one embodiment, the two-way valve 100 generally has a cylindrical shape about an axis A. In one embodiment, the two-way valve 100 includes a valve body 102 portion and a valve assembly 110 portion.

The valve body 102 may include outer 104, 106 and inner 108 threads at each end 101, 103. At a first end 101 and a second end 103, the outer threads 104, 106 are configured to couple (e.g., screw or mate) with corresponding threads of an attachment point such as a pipe, hose, or the like. At the second end 103, the inner threads 108 are configured to couple with the corresponding threads 112 of the valve assembly 110 to secure the valve assembly 110, and its components, to the valve body 102. In one embodiment, the valve body 102 includes a stop 114, a wall, a retaining member, or the like that provides structural resistance against the valve assembly 110 when the valve assembly 110 is installed or coupled to the valve body 102. The stop 114 may be a ring, a washer, and/or the like.

In one embodiment, the valve assembly 110 includes a first valve element, component, portion, or part 116 configured as a stop or plug and a second valve element, component, portion, or part 118, e.g., a washer. The first valve part 116 may include a base portion 120 that includes a lip 122 that is larger than (e.g., has a greater width or diameter) than an opening 128 in the second valve part 118. In such an embodiment, when the first valve part 116 is inserted into the opening 128 in the second valve part 118, the base portion 120 sits within the opening 128 in the second valve part 118 and is prevented from going through the opening 128 in the second valve part 118 by the lip 122. In this manner, fluid flow from the valve body 102 towards the valve assembly 110 is prevented from going into the opening 128 in the second valve part 118, as described in more detail below.

In one embodiment, the first valve part 116 includes a stem 124 that includes an attachment portion 126, e.g., an opening or other attachment means, which is configured to couple the first valve part 116 to a spring 130, or other tension or resistance mechanism, e.g., a hydraulic element. In such an embodiment, the spring 130 secures the first valve part 116 against the second valve part 118 within the opening 128. The spring 130 may be coupled to a first mounting portion 134 at an opposite end of the mounting bracket 132 of the valve assembly 110.

In one embodiment, the second valve part 118 is coupled to a spring 136 (or other resistance mechanism such as a hydraulic element), e.g., welded or otherwise attached to the spring 136, which is coupled to a second mounting portion of the valve bracket 132, e.g., the end with the threads 112 via welds or other attachments means. In one embodiment, the tension or resistance of the spring 130 that is coupled to the first valve part 116 is less than the tension or resistance of the spring 136 coupled to the second valve part 118.

In one embodiment, the tension or resistance of the spring 130 that is coupled to the first valve part 116 may be adjusted via an adjustment mechanism 140, e.g., a bolt or screw. For instance, to increase the tension or resistance of the spring 130, the adjustment mechanism 140, e.g., a screw, bolt, or the like may be manually tightened so that the first valve part 116 is more tightly secured against the second valve part 118, which also means that more pressure or force is required of a fluid flow from the end of the valve assembly 110 towards the valve body 102 to force the first valve part 116 open, e.g., away from the second valve part 118 to allow the fluid flow through the opening 128 in the second valve part 118. In such an embodiment, the stop 114 in the valve body 102 prevents the second valve part 118 from moving with the force of the fluid flow. Instead the first valve part 116 is pushed away from the second valve part 118 and through the opening in the stop 114 to allow the fluid flow though the openings 128, 142 in the second valve part 118 and the stop 114.

In one embodiment, the tension of the spring 136 coupled to the second valve part 118 is adjustable based on how tightly coupled the valve assembly 110 is to the valve body 102, e.g., the more that the valve assembly 110 is twisted or screwed into the valve body 102 will determine how much force or pressure is required to push the spring 136 for a fluid flow from the valve body 102 towards the valve assembly 110. In such an embodiment, the fluid flow enters the opening 142 in the stop, from the first end 101, and presses against the first valve part 116 and the second valve part 118. The first valve part 116 is prevented from entering the opening 128 in the second valve part 118 due to the lip 122. The force of the fluid flow forces the first and second valve portions 116, 118, together, to compress the spring 136 coupled to the second valve part 118 and allow the fluid flow around the first and second valve parts 116, 118, as described in more detail below. In such an embodiment, a diameter or width of the second valve part 118 is less than inner diameter or width of the valve body 102, to allow fluid to flow around the second valve part 118.

In one embodiment, the position of the stop 114 may be adjustable to further set the tension of the spring 136. For example, the stop 114 may be configured to be screwed into the valve body 102 to a predetermined position, the stop 114 may be slidable along the valve body 102 and set within grooves, slots, or the like at predetermined positions along the inside of the valve body 102, or the like.

In this manner, the two-way or dual valve 100 allows fluid flow in two directions given a defined pressure of the fluid flow. Moreover, the two-way valve 100 acts as a check valve to prevent backflow in the system if the requisite pressure or force of the fluid flow is not enough to move the first and second valve parts 116, 118.

Figure 2:
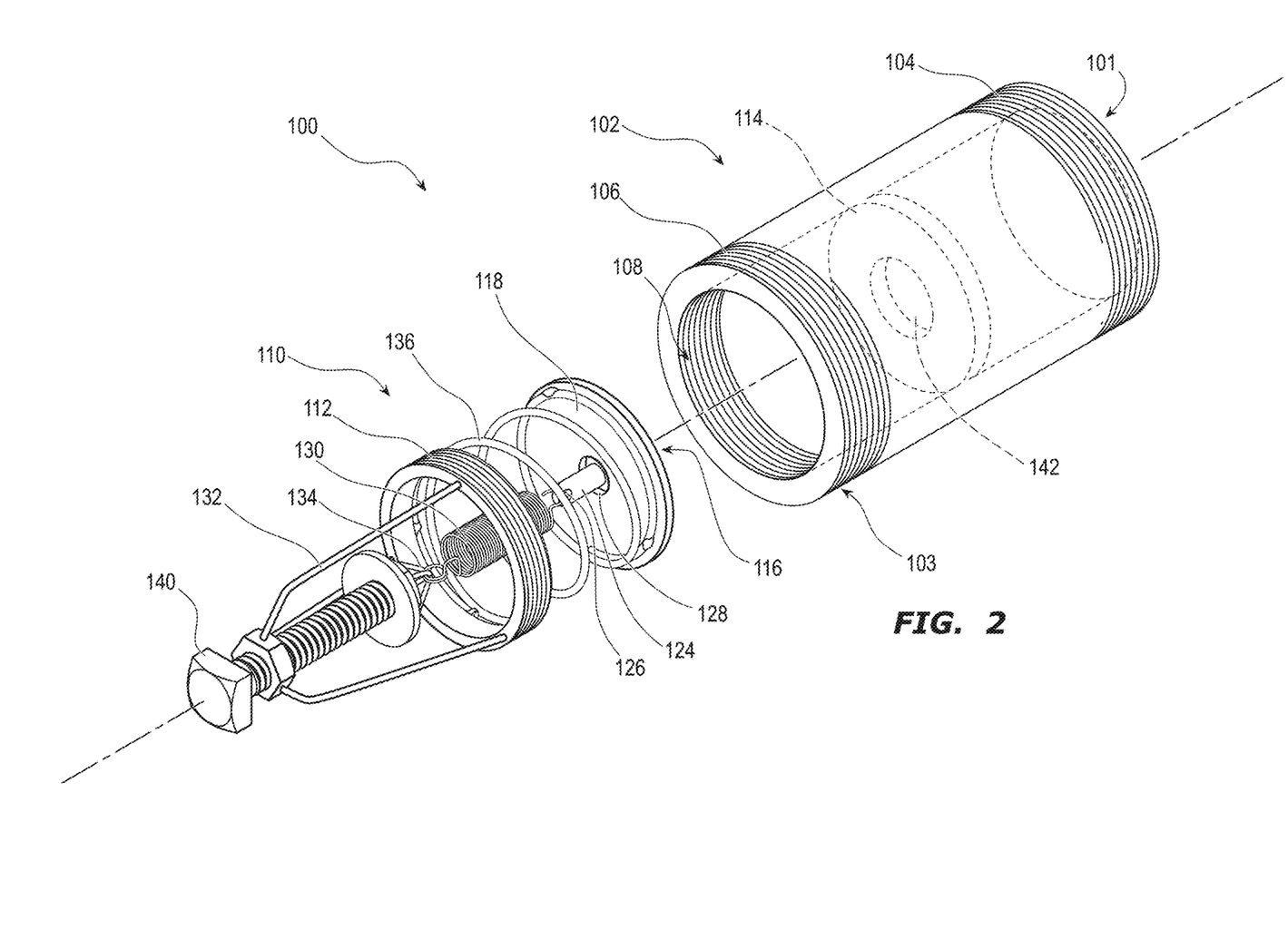
FIG. 2 is another exploded perspective view illustrating one embodiment of a two-way valve in accordance with the subject matter described herein.

FIG. 2 is another exploded perspective view illustrating one embodiment of a two-way valve in accordance with the subject matter described herein. In the depicted embodiment, the adjustment mechanism 140 is screwed or otherwise coupled to the valve bracket 132 and further coupled to the first mounting portion 134 (e.g., via a screw or other means), which applies tension to the spring 130 and pulls the stem 124 of the first valve part 116 through the opening 128 in the second valve part 118 and secures the first valve part 116 against the second valve part 118. The tension of the spring 130 coupled to the first valve part 116 may be increased or decreased by adjusting the adjustment mechanism 140, e.g., tightening or loosening the adjustment mechanism 140.

Figure 3:
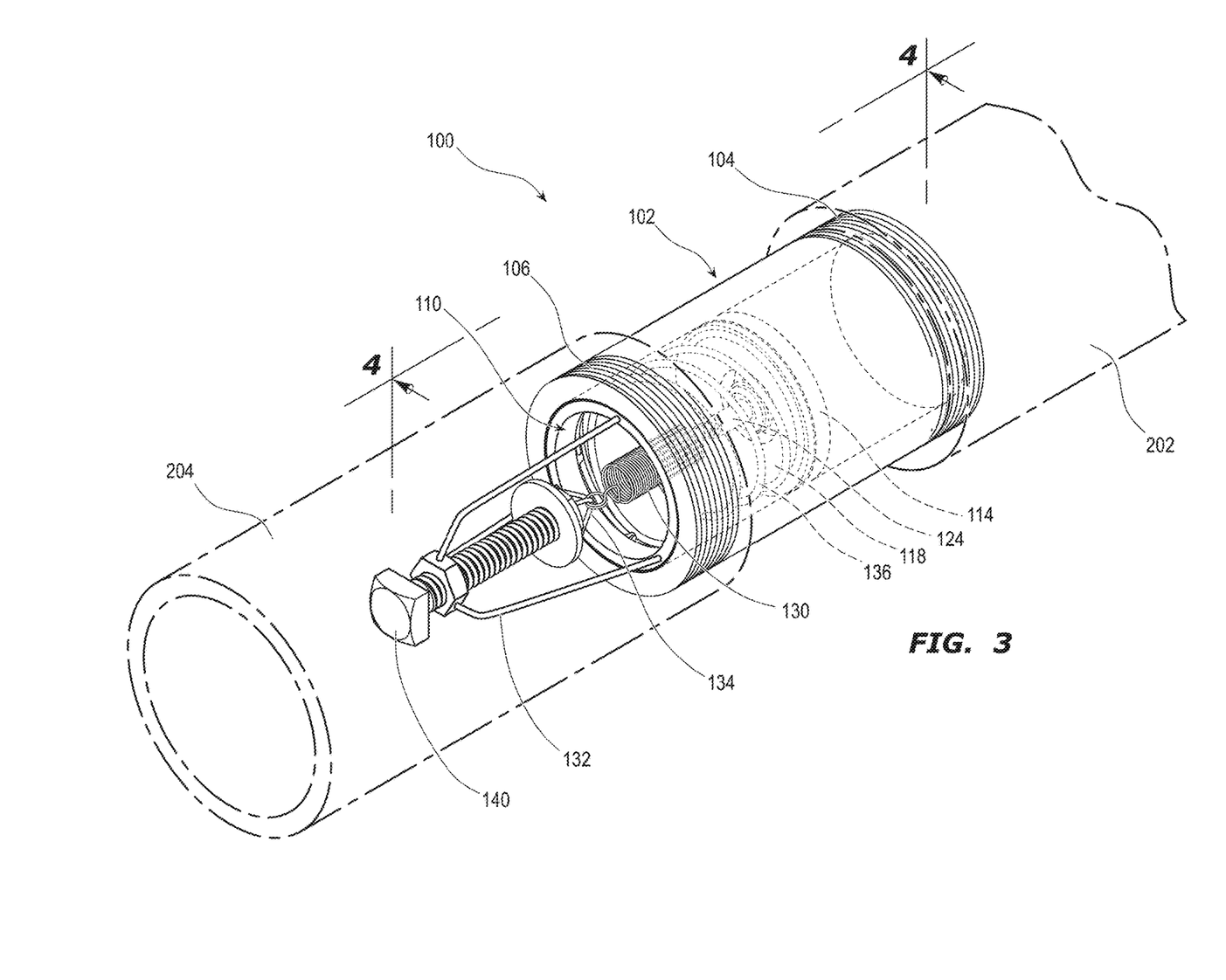
FIG. 3 is a perspective view illustrating one embodiment of an assembled two-way valve in accordance with the subject matter described herein.

FIG. 3 is a perspective view illustrating one embodiment of an assembled two-way valve 100 in accordance with the subject matter described herein. In one embodiment, the valve body 102 is coupled at a first end 101 to a pipe 202 (or hose, another valve, or the like) and at a second end 103 to a different pipe 204 (or hose, another valve, or the like). In the depicted embodiment, the valve body 102 is threaded or screwed to the pipes 202, 204 via the threads 104, 106 on the first and second ends 101, 103.

In the depicted embodiment, the valve assembly 110 is screwed into the valve body 102 such that the second valve part 118 sits against the stop 114 in the valve body 102 and the tension of the spring 136 is set based on how tightly or how far the valve assembly 110 is screwed into the valve body 102.

Figure 4:
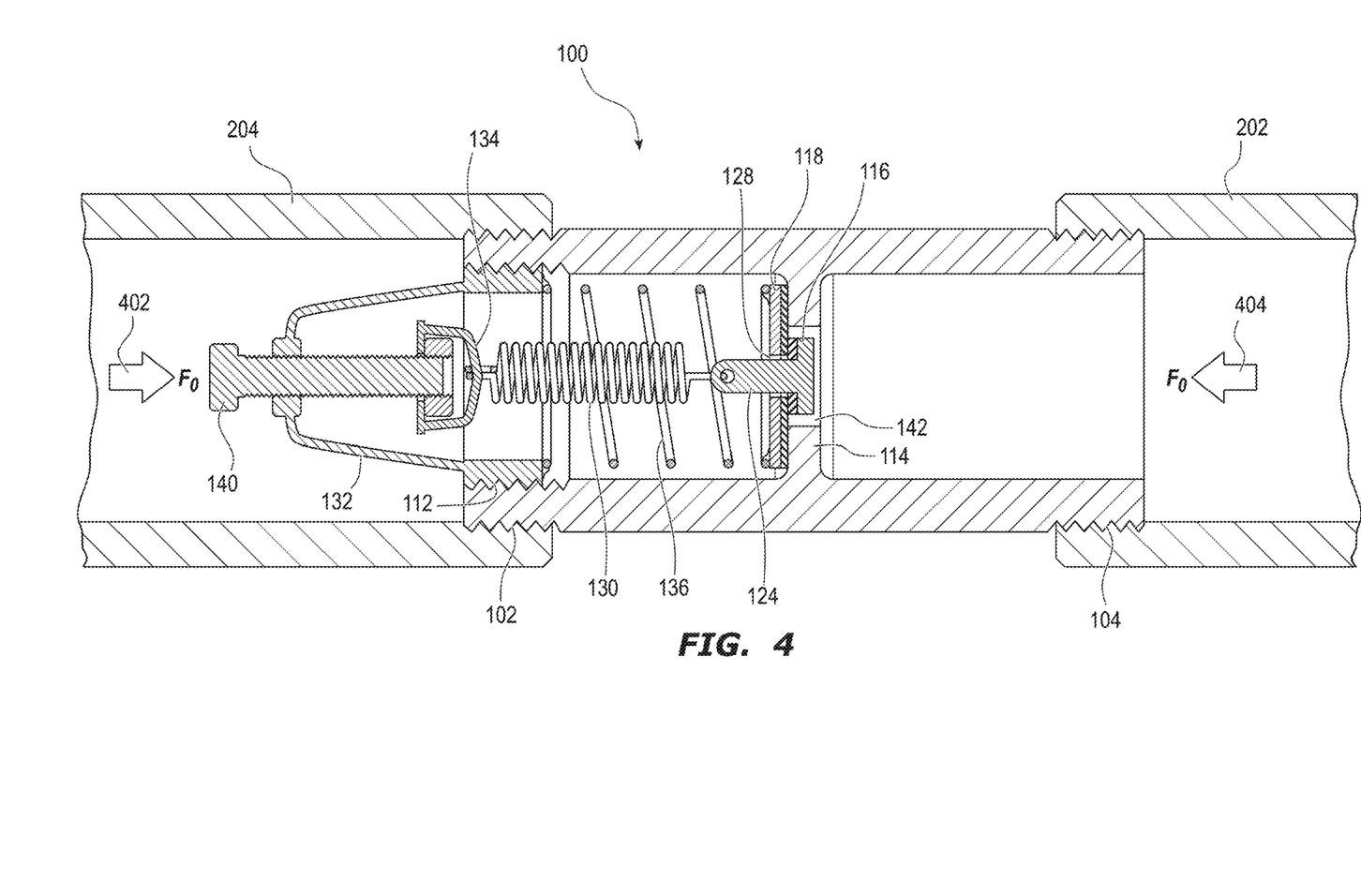
FIG. 4 is a sectional view illustrating one embodiment of a two-way valve in accordance with the subject matter described herein.

FIG. 4 is a sectional view illustrating one embodiment of a two-way valve 100 in accordance with the subject matter described herein. The depicted embodiment shows the two-way valve 100 assembled and installed within a fluid flow system, e.g., installed between two pipes 202, 204, hoses, or the like. FIG. 4 also shows the positions of the first and second valve parts 116, 118 at rest when there is no fluid flow into the valve from a first direction 402 or a second direction 404. The fluid flow may include various materials or material types such as gases, liquids, fluidized solids, or slurries.

Figure 5:
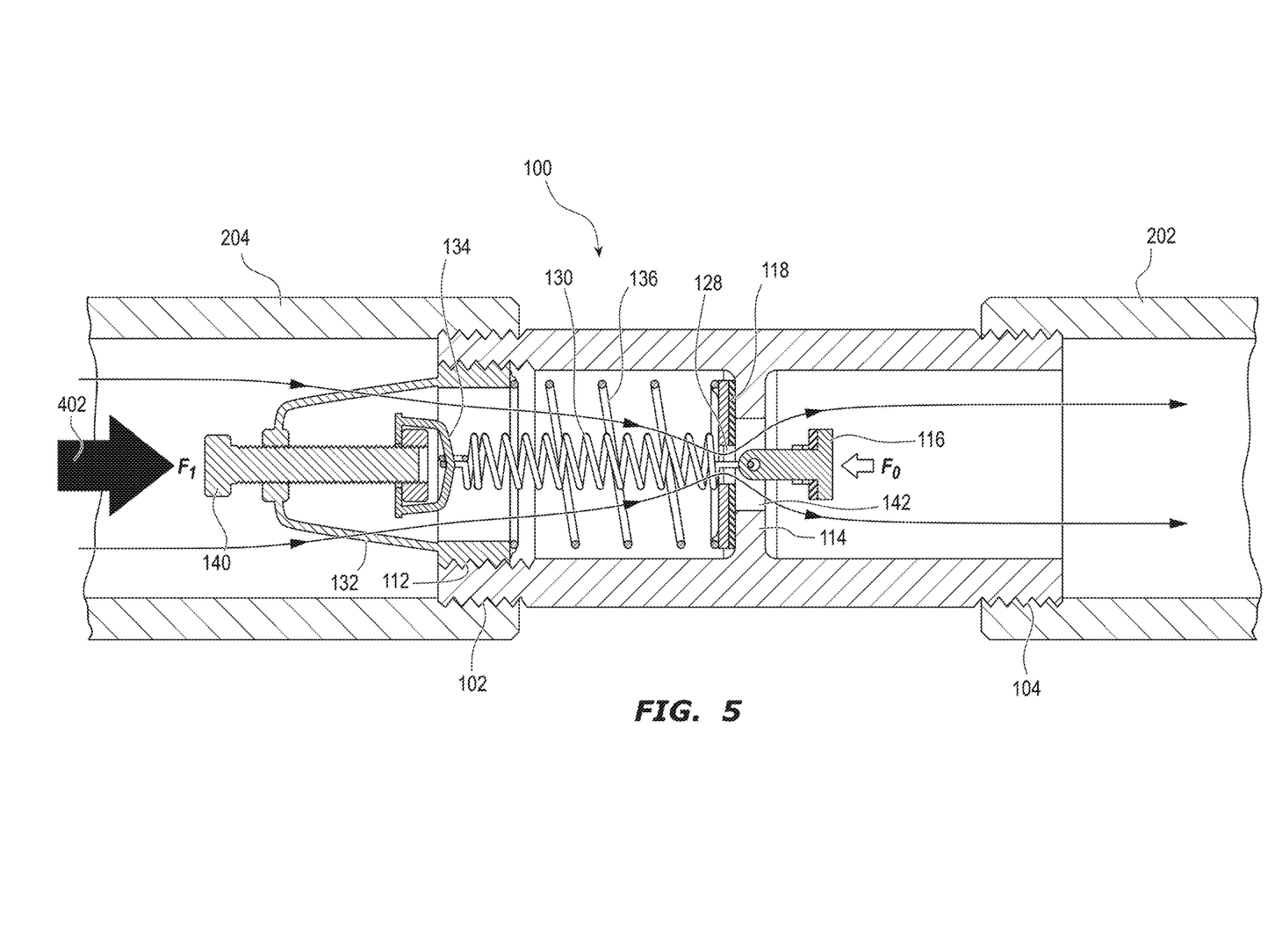
FIG. 5 is a sectional view illustrating one embodiment of fluid flow in a first direction through a two-way valve in accordance with the subject matter described herein.

FIG. 5 is a sectional view illustrating one embodiment of fluid flow in a first direction 402 through a two-way valve 100 in accordance with the subject matter described herein. As fluid flows in the first direction 402, e.g., from left to right in the depicted embodiment, the pressure or force of the fluid flow presses against the first and second valve parts 116, 118 (in addition to tension from the spring 136); however, stop 114 prevents the second valve part 118 from moving in the first direction 402 with the fluid flow. The first valve part 116 is not prevented from moving in the first direction 402 by the stop 114 but extends through the stop 114, due to the pressure of the fluid flow 402, allowing the fluid to flow through the opening 128 in the second valve part 118 and through the stop 114. In such an embodiment, the pressure of the fluid flow is enough to overcome the tension of the spring 130 connected to the first valve part 116 to push the first valve part 116 through the stop 114.

Figure 6:
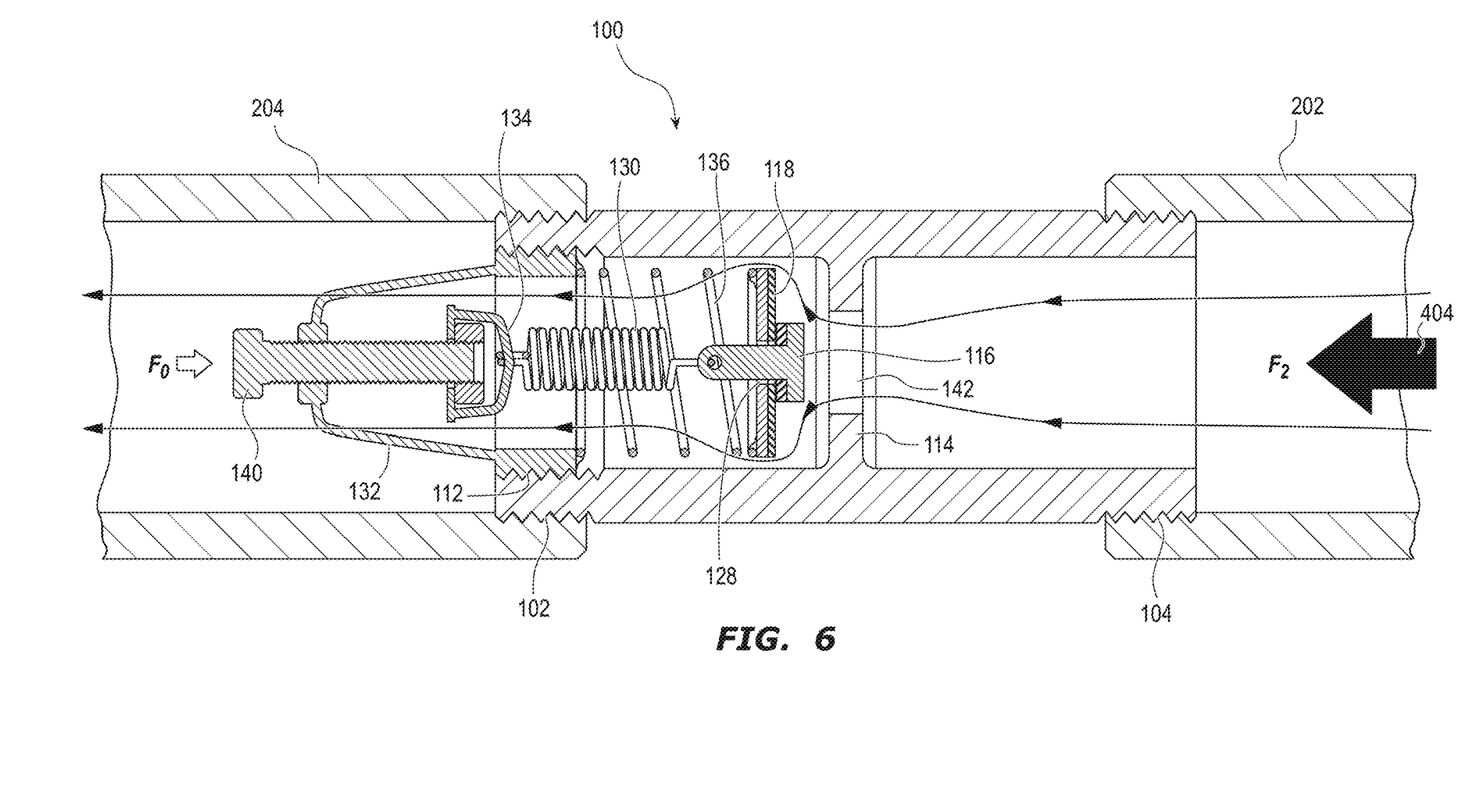
FIG. 6 is a sectional view illustrating another embodiment of fluid flow in a second direction through a two-way valve in accordance with the subject matter described herein.

FIG. 6 is a sectional view illustrating an embodiment of fluid flow in a second direction 404 through a two-way valve 100 in accordance with the subject matter described herein. As fluid flows in the second direction 404, e.g., from right to left in the depicted embodiment, the pressure or force of the fluid flow 404 presses against the first and second valve parts 116, 118 and causes the first and second valve parts 116, 118 to move in the second direction 404 with the fluid flow 404 allowing the fluid to flow through the opening in the stop 114 and around the second valve part 118. In such an embodiment, the pressure of the fluid flow 404 is enough to overcome the tension or resistance of the spring 136 connected to the second valve part 118 to push the second valve part 116 away from the stop 114. In such an embodiment, a diameter or width of the second valve part 118 is less than inner diameter or width of the valve body 102, to allow fluid to flow around the second valve part 118.

Figure 7:
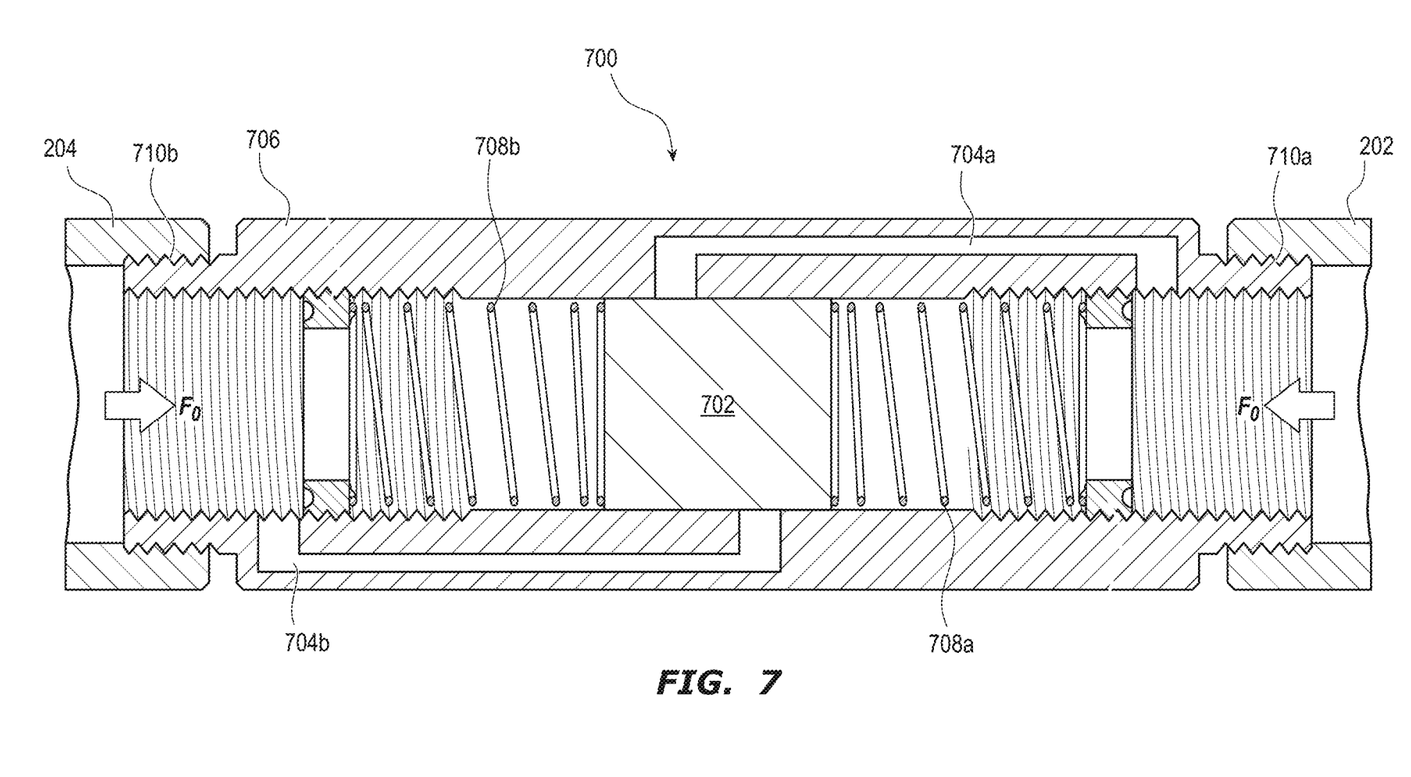
FIG. 7 is a sectional view illustrating one embodiment of a two-way valve in accordance with the subject matter described herein.

FIG. 7 depicts another embodiment of a two-way valve 700. In one embodiment, the two-way valve 700 includes a valve body 706 and a valve assembly 702. The valve body 706 houses the valve assembly 702 and may be manufactured of a substantially rigid material and have a cylindrical shape, e.g., similar to a pipe. The valve body 706 may include outer threads 710a, 710b for securing the valve body 706 to other components 202, 204 such as hoses, pipes, or the like using a screw mechanism.

In one embodiment, the valve body 706 includes one or more passageways 704a, 704b for directing flow through the valve body. In such an embodiment, the valve body 702 may include a flow control element 702 that is configured to slide or move within the valve body 706 based on the direction of the flow and the rate/pressure of the flow. The flow control element 702 may be coupled to springs 708a, 708b on each side that control the amount of movement of the flow control element 702 and the tension on the flow control element 702 that determines how much pressure or force is needed to move the flow control element 702.

Figure 8:
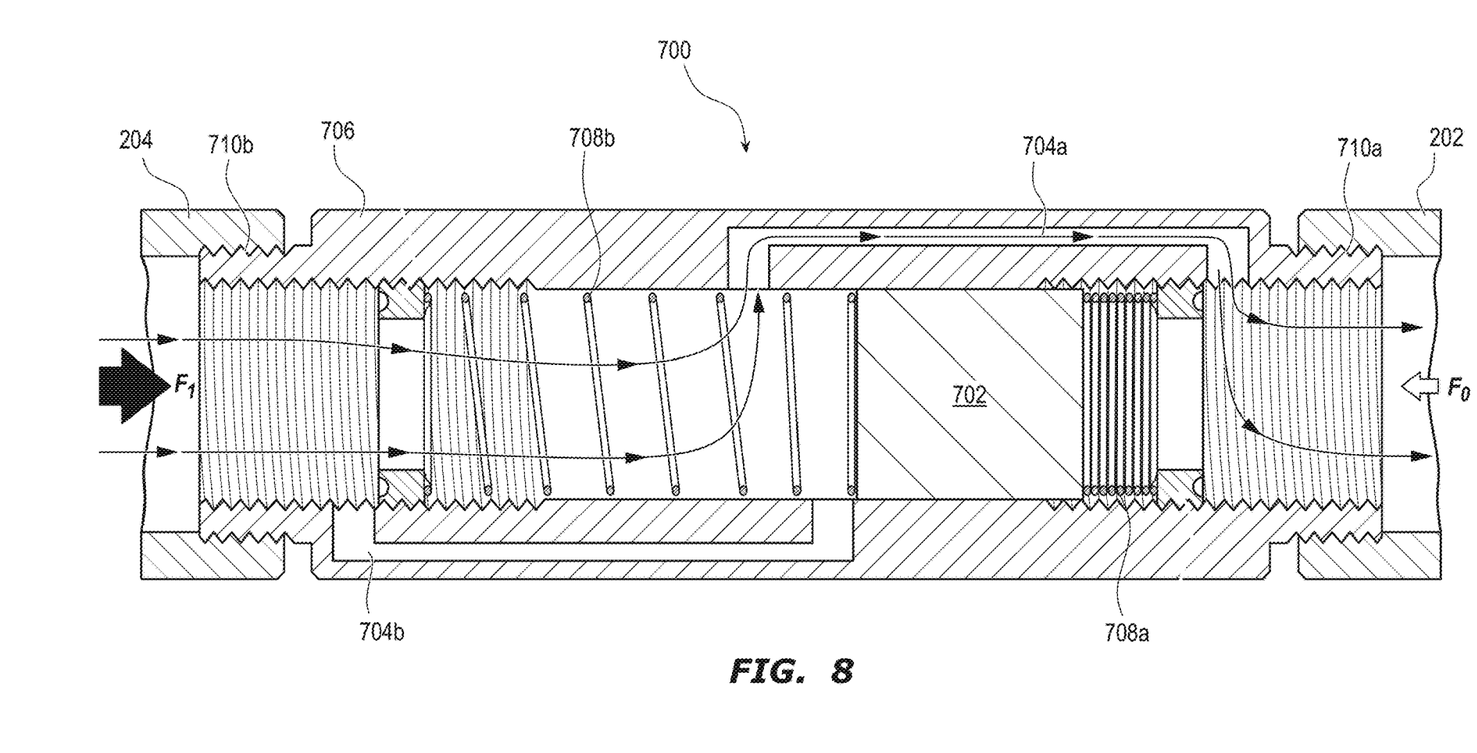
FIG. 8 is a sectional view illustrating one embodiment of fluid flow in a first direction through a two-way valve in accordance with the subject matter described herein.

FIG. 8 depicts one embodiment of the two-way valve shown in FIG. 7 where a flow 802, e.g., a fluid flow, enters the valve body 706 from the left side with enough force, pressure, or rate to push the flow control element 702 to the right, opening the entry to a first passageway 704a and allowing the flow 802 to bypass the flow control element 702 and exit through the right side of the valve body 706.

Figure 9:
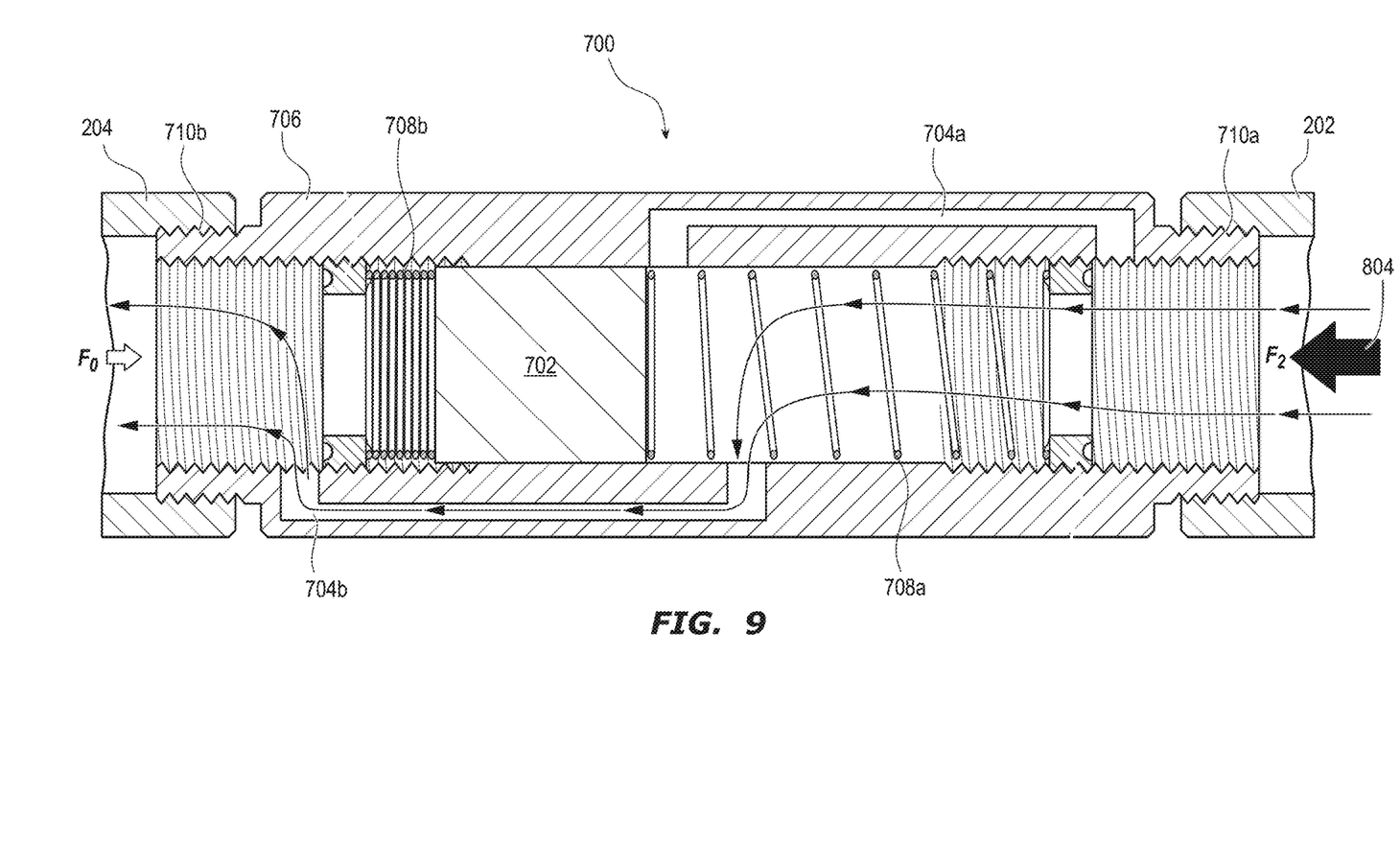
FIG. 9 is a sectional view illustrating another embodiment of fluid flow in a second direction through a two-way valve in accordance with the subject matter described herein.

FIG. 9 depicts one embodiment of the two-way valve shown in FIG. 7 where a flow 804, e.g., a fluid flow enters the valve body 706 from the right side with enough force, pressure, or rate to push the flow control element 702 to the left, opening the entry to a second passageway 704b and allowing the flow 802 to bypass the flow control element 702 and exit through the left side of the valve body 706.

Figure 10:
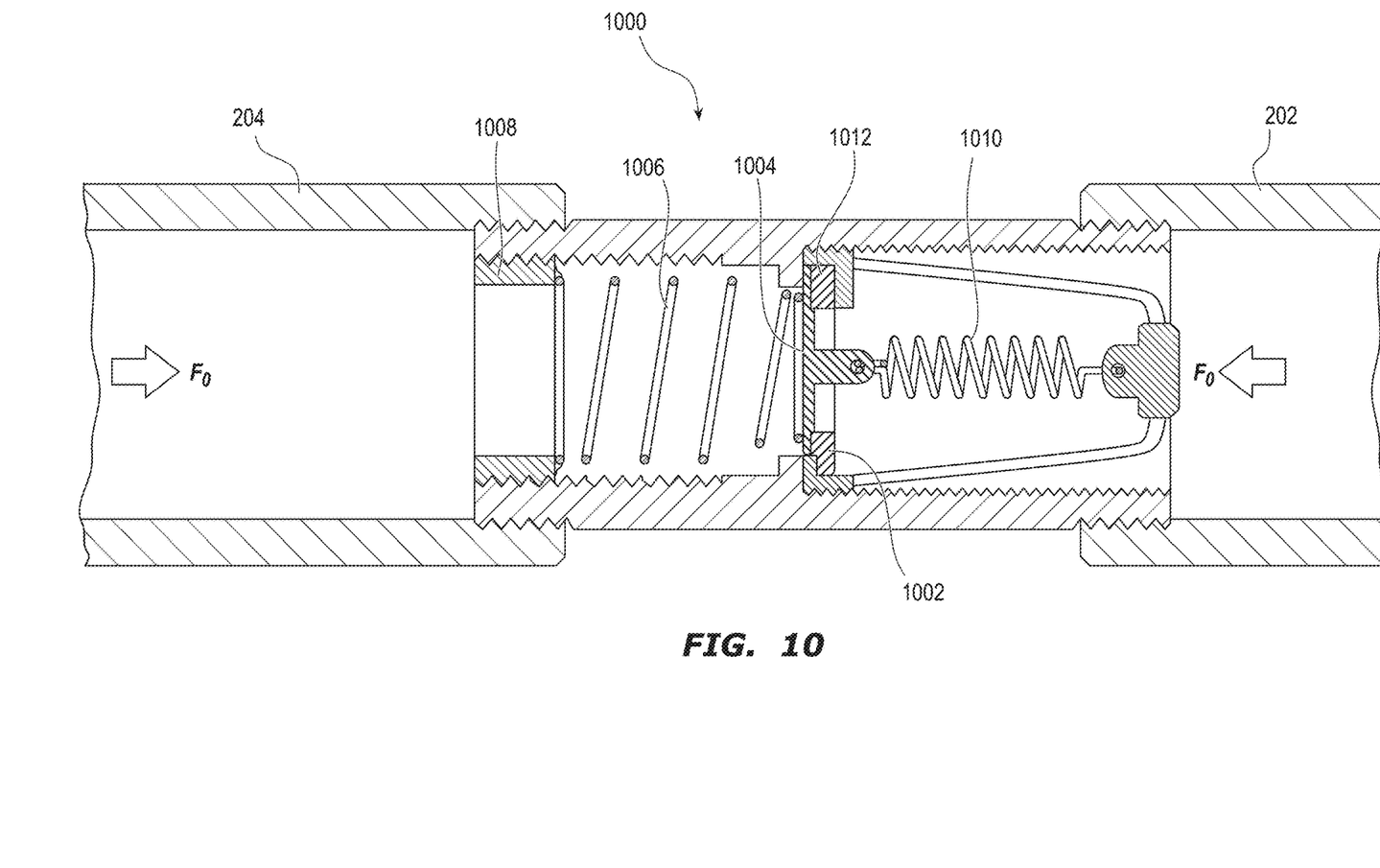
FIG. 10 is a sectional view illustrating one embodiment of a two-way valve in accordance with the subject matter described herein.

FIG. 10 depicts another embodiment of a two-way valve 1000. In one embodiment, the two-way valve 1000. In such an embodiment, the two-way valve 1000 includes a valve assembly that may be substantially similar to the valve assembly shown above with reference to FIG. 1. The valve assembly shown in FIG. 10 includes a first valve part 1004 and a second valve part 1002 that controls fluid flow through the two-way valve 1000.

The second valve part 1002, in one embodiment, may be configured as a flapper valve where the second valve part 1002 is coupled to a hinge member 1012 such that the second valve part 1002 can be forced open when flow satisfies a threshold pressure or force (to overcome the tension in the spring 1006 coupled to the second valve part 1002 and the end 1008 of the valve body).

Figure 11:
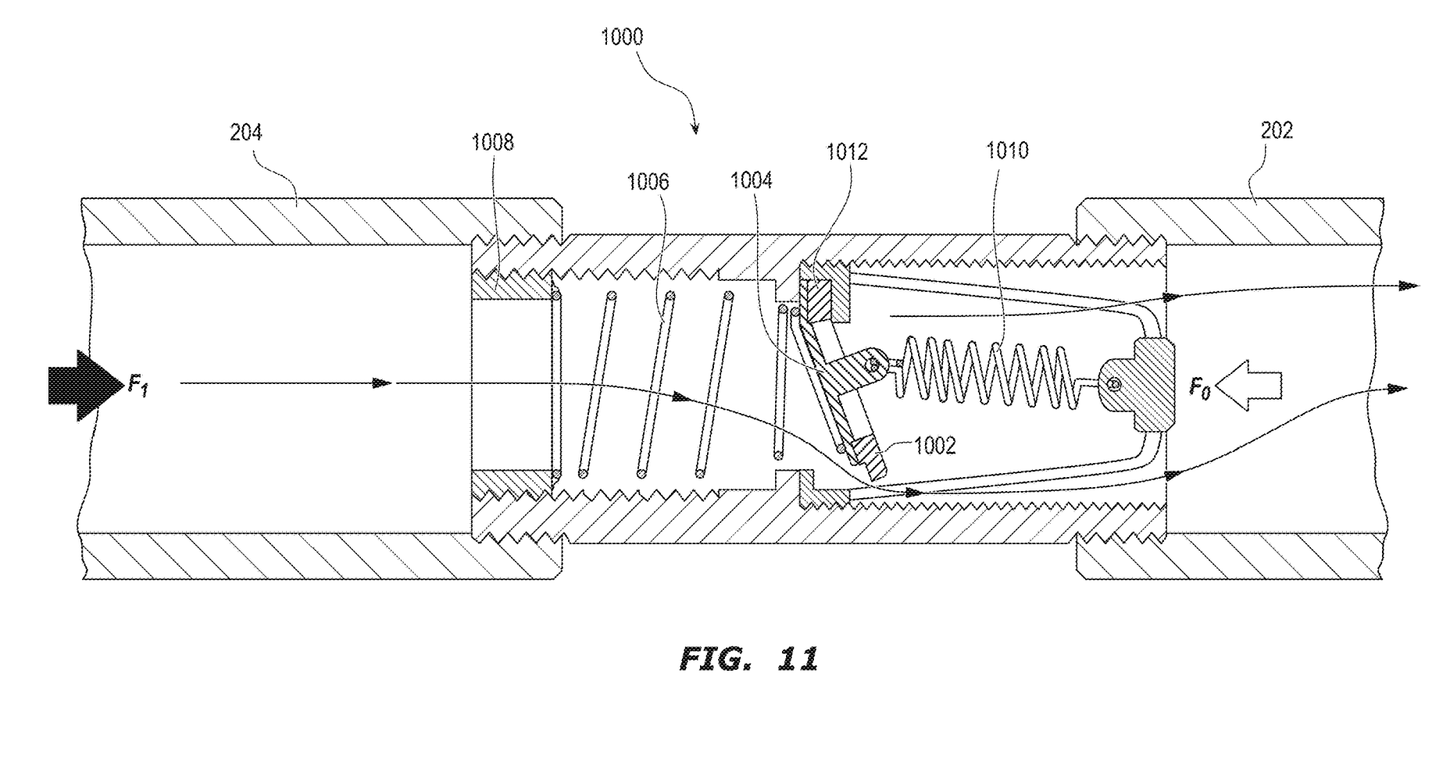
FIG. 11 is a sectional view illustrating one embodiment of fluid flow in a first direction through a two-way valve in accordance with the subject matter described herein.

As shown in FIG. 11, when a flow 1102 enters the two-way valve 1000, if the flow rate/pressure/force is enough to overcome the tension in the spring 1006 coupled to the second valve part 1002, the second valve part 1002 is rotates around the hinge 1012 to open and allow flow through the two-way valve 1000. In such an embodiment, the first valve part 1004 opens with the second valve part 1002 using the tension in the spring 1010 coupled to the first valve part 1004.

Figure 12:
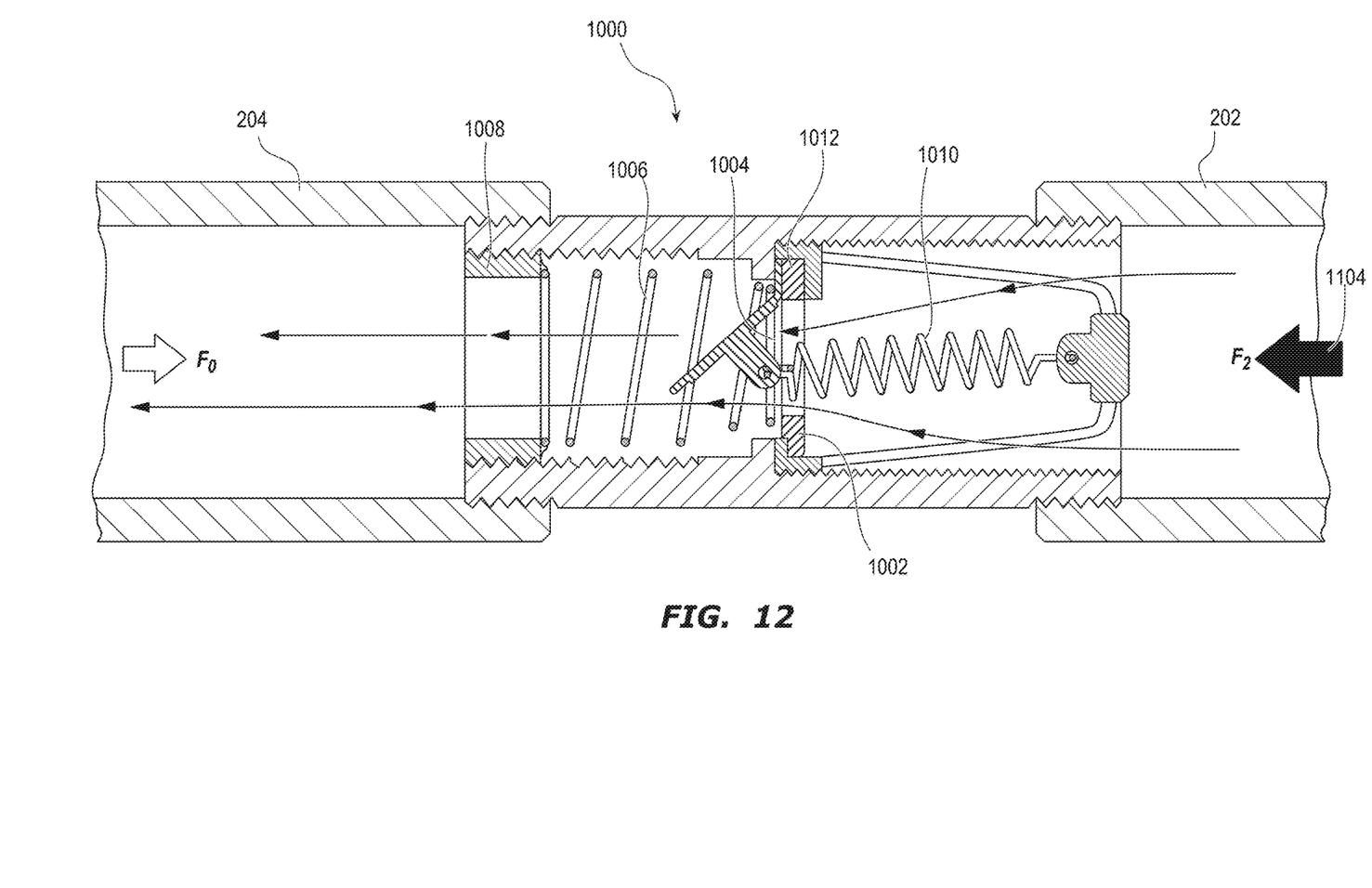
FIG. 12 is a sectional view illustrating another embodiment of fluid flow in a second direction through a two-way valve in accordance with the subject matter described herein.

As shown in FIG. 12, when flow 1104 enters the two-way valve 1104 from the opposite direction, the second valve part 1002 remains in place while the first valve part 1004 opens to allow flow through the two-way valve 1000, assuming the rate/force/pressure of the flow is enough to overcome the tension in the spring 1010. In such an embodiment, the first valve part 1004 may also be connected to the second vale part 1002 using a hinge member so that it also acts like a flapper valve.

Figure 13:
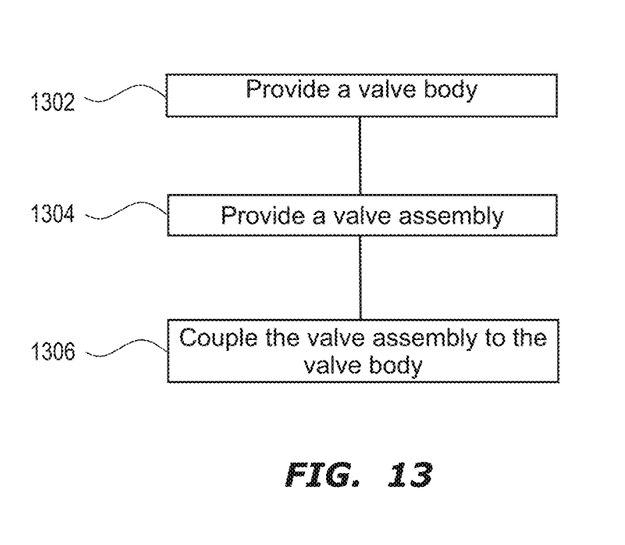
FIG. 13 is a flow-chart diagram of one embodiment of a method for a two-way valve in accordance with the subject matter described herein.

FIG. 13 depicts one embodiment of a method of a two-way valve. In one embodiment, the method begins and provides 1302 a valve body, provides 1304 a valve assembly, and couples 1306 the valve assembly to the valve body, and the method ends. In one embodiment of the method, the valve assembly includes a first valve component and a second valve component. In one embodiment, the first valve component is actionable to allow or prevent a first fluid flow in a first direction. In one embodiment, the second valve component is actionable to allow or prevent a second fluid flow in a second direction opposite the first direction.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a valve body; and
   a valve assembly couplable to the valve body, the valve assembly comprising a first valve component and a second valve component that are interconnected,
   wherein the first valve component is actionable to allow or prevent a first fluid flow through the apparatus in a first direction,
   wherein the second valve component is actionable to allow or prevent a second fluid flow through the apparatus in a second direction opposite the first direction, and
   wherein the first valve component is coupled to a resistance member that pulls the first valve component towards the second valve component to plug an opening in the second valve component until a pressure of the first fluid flow overcomes the resistance member to allow the first fluid flow through the opening in the second valve component.

2. The apparatus of claim 1, wherein the resistance member comprises a spring.

3. The apparatus of claim 1, further comprising an adjustment mechanism that is actuable to adjust a resistance of the resistance member.

4. The apparatus of claim 1, wherein the second valve component is coupled to a resistance member that is configured to push the second valve component in a direction opposite the second fluid flow.

5. The apparatus of claim 4, wherein the resistance member comprises a spring.

6. The apparatus of claim 4, wherein the valve body comprises a retaining member that is configured act against the second valve component and set a tension of the resistance member.

7. The apparatus of claim 6, wherein the valve assembly is screwed into the valve body and the tension of the resistance member is set based on how far the valve assembly is screwed into the valve body.

8. The apparatus of claim 6, wherein the retaining member includes at least one opening for allowing fluid flow through the valve body.

9. The apparatus of claim 6, wherein the first valve component and the second valve component are forced away from the retaining member in response to a pressure of the second fluid flow acting against the first valve component and the second valve component to allow the second fluid flow to flow around the second valve component.

10. The apparatus of claim 9, wherein the second valve component has a smaller diameter than an inner diameter of the valve body.

11. The apparatus of claim 6, wherein a position of the retaining member within the valve body is adjustable to adjust a resistance of the resistance member coupled to the second valve component.

12. A two-way valve, comprising:
a valve body comprising a retaining member within the valve body;
a valve assembly couplable to the valve body, the valve assembly comprising:
a first valve component coupled to a first resistance member, the first resistance member pulling the first valve component in a first direction; and
a second valve component coupled to a second resistance member, the second resistance member pushing the second valve component in a second direction opposite the first direction,
wherein the first valve component is actionable to allow or prevent a first fluid flow through the two-way valve towards the second direction, and
wherein the second valve component is actionable to allow or prevent a second fluid flow through the two-way valve in the first direction.

13. The two-way valve of claim 12, wherein the first valve component is configured as a plug for an opening in the second valve component.

14. The two-way valve of claim 13, wherein the first valve component is forced away from the second valve component in response to a pressure of the first fluid flow acting against the first valve component to allow the first fluid flow through the opening in the second valve component.

15. The two-way valve of claim 12, wherein the first valve component and the second valve component are forced away from the retaining member in response to a pressure of the second fluid flow acting against the first valve component and the second valve component to allow the second fluid flow to flow around the second valve component.

16. The two-way valve of claim 12, further comprising an adjustment mechanism that is actuable to adjust a resistance of the first resistance member.

17. A method, comprising:
providing a valve body;
providing a valve assembly, the valve assembly comprising a first valve component and a second valve component that are interconnected; and
coupling the valve assembly to the valve body,
wherein the first valve component is actionable to allow or prevent a first fluid flow in a first direction,
wherein the second valve component is actionable to allow or prevent a second fluid flow in a second direction opposite the first direction, and
wherein the first valve component is coupled to a resistance member that pulls the first valve component towards the second valve component to plug an opening in the second valve component until a pressure of the first fluid flow overcomes the resistance member to allow the first fluid flow through the opening in the second valve component.

* * * * *